UNITED STATES PATENT OFFICE.

JOHN HARRIS JONES, OF BOUNDBROOK, NEW JERSEY.

COMPOSITION OF EDIBLE FATS.

1,381,468.  Specification of Letters Patent.  Patented June 14, 1921.

No Drawing.  Application filed December 26, 1917. Serial No. 208,805.

*To all whom it may concern:*

Be it known that I, JOHN HARRIS JONES, a subject of King George V of England, and a resident of Boundbrook, in the county of Somerset and State of New Jersey, have invented a certain new and useful Invention in Composition of Edible Fats, of which the following is a specification.

The invention relates to an article of manufacture consisting of fats, and fats and oils congealed and admixed with a flavoring composition to provide an edible product to be used much in the same manner and for the same purposes as butter, oleo, margarin, butterin, oil butters, and similar articles.

As hereinafter disclosed, the objects of the invention will be apparent from the results attained in forming the product, which provides a clean, hygienic article overcoming many of the difficulties heretofore encountered in the treatments of fats and oils for producing a pure, clean edible product having the attributes of butter and with its perfect flavor.

That the invention may be more clearly understood, reference is made to the simple process of producing milk or cream butter and so-called "oleo" or "oleomargarin," although in referring to these processes they are briefly described and no attempt has been made to cover the various details which have come into common use.

In the preparation of cow butter, the fat or cream is separated from the milk and said cream is then permitted to ripen, although it is generally fermented with what is known as a "commercial starter."

There is an intermediate step in which a "mother starter" is produced by impregnating and culturing a pasteurized milk or cream with the so-called "commercial starter." The "mother starter" is then employed in desired quantity to set up a lactic fermentation in the separated cream which is to be churned.

When suitably ripened by lactic fermentation, the cream is churned to produce butter and, of course, is worked and washed to free it of the so-called buttermilk and other constituent elements of milk. The water must be well worked out, however, to prevent beading or sweating, and salt is added to give the required flavor.

There are certain disadvantages in the above described methods as it has been impossible to prevent the culturing of foreign bacilli as the hay bacillus and others which grow in the milk or cream and provide "off" flavors. In other words, the materials must be treated with the greatest care and even then there is great liability of side cultures being formed in conjunction with the correct lactic fermentations, which will develop "off" flavors and rancidity, even by careful preparation of the "mother starter." There is no definite insurance against developing these objectionable characteristics.

In the manufacture of oleos, oleomargarins, and butterins, the same difficulties are encountered inasmuch as these materials all rely to a greater or less extent upon the infusion of cultured milk or cream or butter. In using the term "milk," "cream," or "butter," there is included only such materials as are the results of the secretions of the mammary glands of female mammals.

Briefly, the preparation of oleo, oleomargarin, and such product necessitates the mixing of oils and stearins churned with milk or butter to a smooth consistency. The general composition includes oleo-oil, neutral lard, milk, or cream, or pure butter. The various materials are reduced in individual vessels until they are sufficiently in liquid form (oil form) to be churned together. They are then admixed and churned with a cultured milk, cream, or butter to give the required butter flavor. After being so churned, they are dropped into an ice bath where the fats congeal. These fats are then collected and worked out in an ordinary butter-working apparatus to give a smooth texture which closely resembles the texture of cow butter. During this working it is, of course, salted to any desired flavor.

Obviously, the preparation of such material carries with it the same liability of side fermentations as referred to in the manufacture of cow butter inasmuch as the fermenting material—that is, cultured milk or cream—is churned into the fats and oils and very frequently sets up side fermentations which produce "off" flavor and rancidity, inasmuch as the culturing proceeds to work upon the fats and oils and there is an internal fermentation in the finished product.

In producing my composition, I employ a flavoring composition or base which may be prepared as a complete and distinct element and may be directly admixed with the sweet, churned fat or fats and oils, and has many meritorious attributes such as hereinafter defined.

I make no claim herein to the flavoring composition *per se* nor to its process of production.

The flavoring consists of a vegetable base cultured with bacteria to produce a perfect butter flavor. In practice, I utilize a base material such as a starch or paste, formed from wheat flour, rice or barley flour, which is made sterile by boiling and is then held at a temperature within the life-growing temperatures of the bacillus employed, until a sufficient lactic acid fermentation has resulted, to give the required flavor. The material may then be made sterile to prevent further culturing, and remains a fixed product ready for mixing with the fats, or oils and fats to produce a proper butter flavor therein. For producing the flavoring composition I have found the following to be satisfactory in practice: 22¼ parts of bran, 22½ parts of whole wheat, 45 parts of glucose, 16 parts of cane sugar and 900 parts of water are intimately mixed and then sterilized, after which the mixture is cooled quickly to a temperature, suitable for propagation of lactic acid bacteria. When the mixture has reached the required temperature, say about 80 degrees F., I add to the mixture a small quantity of lactic acid bacteria, which can be procured in the form of commercial starter. Such mixture is allowed to ferment for 48 hours, or until an acidity of .4% is reached.

By using the flavoring composition referred to, it is not necessary to culture the cream as heretofore, thus saving a great amount of time in manufacture.

For instance, sweet cream may be sterilized and churned into a sweet butter and the sweet butter may then be admixed with the flavoring composition and, when salted to the required degree, will give a smooth, pure butter of definite quality, character, and flavor. The use of the flavoring composition not only saves time in culturing or starting the cream, but reduces the labor of manufacture and gives a more uniform product. It obviates the necessity of the fine degree of working required in handling creams in the ordinary well-known manner, inasmuch as the flavoring composition has a capacity for absorbing free moisture which would ordinarily exude as bead or sweat from the butter. It obviates the liability of washing out the culture which is at present required to ripen the butter. Thus, a product may be made immediately from sweet, sterilized cream in which all bacterial cultures are destroyed by immediate congealing of the fat and admixture with the prepared flavoring base. The resultant product is permanent as there is no opportunity for development of side fermentations and the true flavor is secured from the carefully prepared and fixed flavoring base.

In like manner, the manufacture of oleos, olemargarins, and like products is improved, both as regards cost and labor and as to excellence of finished product.

It is unnecessary to reduce the oils, fats, and stearins to a liquid or oil form, as for churning with the cultured milk or cream and subsequently cooling by immersion in a cold bath. The oils and fats may be admixed at a temperature well within the melting point of the ingredient having the highest melting point, and the flavoring composition may be directly introduced and admixed therewith in the ordinary butter-working machines until the required texture is secured.

This obviates the necessity of using individual jacketed kettles for the various ingredients and the careful churning of said ingredients with the cultured or ripened skimmed milk or other product.

It is, of course, imperative under present practice to reduce the oils and fats; otherwise, the cultured milk will not carry through the mass and give the required flavor. The use of cultured milk in churning such materials carries with it the great liability of infusion of undesirable bacteria which often produce side fermentation that re-act upon the fats and oils to produce "off" flavors and rancidity.

My finished product consists of pure, sterile fats and oils admixed with a sterile flavoring composition and gives a material permanent in its character and with all the attributes of texture and flavor required in any of the edible products referred to.

What I claim as my invention and desire to secure by Letters Patent is:

1. An article of manufacture comprising an edible fat admixed with a cultured edible vegetable base material.

2. An article of manufacture comprising an edible fat admixed with an edible vegetable base flavored by lactic acid fermentation.

3. An article of manufacture comprising an edible fat base churned to a congealed mass, admixed with a flavoring material comprising an edible flavored by lactic fermentation.

4. As an article of manufacture, animal fats and edible oils churned to congeal and admixed with an edible vegetable material having the flavor of butter.

5. As an article of manufacture, a product comprising edible oils and fats churned into a congealed mass and admixed with a flavoring composition comprising an edible vegetable base having a butter flavor due to lactic fermentation.

JOHN HARRIS JONES.

Witnesses:
BESSIE A. MILLHEISER,
EDITH REMOND.